United States Patent Office 3,015,571
Patented Jan. 2, 1962

3,015,571
COMPOSITION CONTAINING THERMOPLASTIC POLYMER AND DINITROPHENYL-R-ETHER AS PLASTICIZER THEREFOR
Norman J. Bowman, Hammond, Ind., and Wayne A. Proell, Chicago, Ill., assignors to Standard Oil Company, Chicago, Ill., a corporation of Indiana
No Drawing. Filed Sept. 24, 1957, Ser. No. 686,810
5 Claims. (Cl. 106—188)

This invention relates to a plasticizer for polymers.

In the field of solid propellants based on ammonium nitrate as the oxidizer binders are used to permit the formation of shaped grains. For reasons of economy of manufacture, it is desirable that the grain have qualities which permit formation by extrusion. In order to attain this end polymeric materials are combined with plasticizers to produce thermoplastic compositions which can be combined with the ammonium nitrate to form plastic masses at temperatures of about 100° C. Not only must the plasticizers used for this purpose be excellent materials for softening polymers such as cellulose esters and polyvinyl chloride but also the plasticizers must not upset the oxygen balance of the propellant.

An object of the invention is a plasticizer suitable for use with organic polymeric materials. A particular object is a thermoplastic composition of an organic polymer and plasticizers suitable for manufacture of ammonium nitrate type solid propellants. Other objects will be apparent in the course of the detailed description.

The plasticizer of the invention consists essentially only of dinitrophenyl-R-ether wherein R is either propyl or allyl, for example dinitrophenyl-n-propyl ether.

The plasticizer is readily prepared by reacting dinitrochlorobenzene and a suitable propyl alcohol or allyl alcohol in the presence of aqueous sodium hydroxide.

The dinitrophenyl-R-ether is a suitable plasticizer for these organic polymers: The cellulose esters of acetic acid, propanoic acid and butyric acid, including the mixed esters; examples of these are cellulose acetate, cellulose butyrate, and cellulose acetate propionate. The polyvinyl polymers namely, polyvinyl butyral, polyvinyl chloride, and polyvinyl acetate. Polyacrylonitrile is a suitable polymer. Polystyrene is a suitable polymer. The co-polymers of styrene and acrylonitrile is also plasticizable. For the purposes of this disclosure petroleum asphalt is defined as an organic polymer. In addition to the asphalts which are naturally occurring or obtainable by distillation from crude oil or propane precipitation form crude oil, asphalts which have been obtained by oxidation of petroleum materials are plasticizable. An example of a particularly suitable asphalt is a roofing grade material obtained by air-blowing a petroleum residuum; this asphalt has a softening point falling within the range of 215°–235° F., a Cleveland open cup flash point above 550° F. and an ASTM penetration of more than 0.8 mm. at 32° F. and not more than 4.00 mm. at 115° F.

The thermoplastic composition comprising the dinitrophenyl-R-ether and polymer generally contains between about 18 and 40 percent of the polymer. (In this specification and claims all percentages are by weight).

Although for many uses a simple thermoplastic composition consisting only of one of the polymers and one of the defined ethers is suitable, when the most rigid military specifications are to be met with ammonium nitrate solid propellants it is generally desirable to have present in the binder an adjunct plasticizer. It is to be understood that the thermoplastic composition used as a binder may contain in addition to the polymer the defined ether and an adjunct plasticizer various amounts of other additives which serve certain purposes in the manufacture of the propellant grain or in improving operational characteristics of the propellant grain. In general a thermoplastic composition containing adjunct plasticizer will still contain between about 18 and 40 percent of the defined polymer.

The adjunct plasticizers are in general oxygen containing organic materials. Broadly any of the known plasticizers for one or more of the defined polymers may be used to some extent in combination with the polymer and the defined dinitrophenyl-R-ether. The requirements of a particular binder may eliminate from use one or more of the commonly known plasticizers. In addition to oxygen many of the better adjunct plasticizers contain nitro groups. Examples of several broad classes of materials suitable for use as adjunct plasticizers are set out hereinafter along with illustrative compounds from each of these broad classes. It is to be understood that the list set out hereinafter is not limiting and is intended to be merely a guidepost for the workers in this art. Suitable adjunct plasticizers are:

A. Di-lower alkyl-phthalates, e.g., dimethyl phthalate, dibutyl phthalate, dioctyle phthalate and dimethyl nitrophthalate.
B. Nitrobenzenes, e.g., nitrobenzene, dinitrobenzene, nitrotoluene, dinitrotoluene, nitroxylene, and nitrodiphenyl.
C. Nitrodiphenyl ethers, e.g., nitrodiphenyl ether and 2,4-dinitrodiphenyl ether.
D. Tri-lower alkyl-citrates, e.g., triethyl citrate, tributyl citrate and triamyl citrate.
E. Acyl tri-lower alkyl-citrates where the acyl group contains 2-4 carbon atoms, e.g., acetyl triethyl citrate and acetyl tributyl citrate.
F. Glycerol-lower alkanoates, e.g. monoacetin, triacetin, glycol tripionate and glycerol tributyrate.
G. Lower alkylene-glycol-lower alkanoates wherein the glycol portion has a molecular weight below about 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).
H. Dinitrophenyl-lower alkyl-lower alkanoates, e.g., dinitrophenyl ethylacetate, and dinitrophenyl amyloctoate.
I. Lower alkylene-glycols wherein the molecular weight is below about 200, e.g., diethylene glycol, polyethylene glycol (200), and tetrapropylene glycol.
J. Lower alkylene-glycol oxalates, e.g., diethylene glycol oxalate and polyethylene glycol (200) oxalate.
K. Lower alkylene-glycol maleates, e.g., ethylene glycol maleate and bis-(diethylene glycol monoethyl ether) maleate.
L. Lower alkylene-glycol diglycolates, e.g., ethylene glycol diglycolate and diethylene glycol diglycolate.
M. Miscellaneous diglycollates, e.g., dibutyl diglycollate, dimethylalkyl diglycollate and methylcarbitol diglycollate.
N. Lower alkyl-phthalyl-lower alkyl-glycollate, e.g., methyl phthalyl ethyl glycollate, ethyl phthalyl ethyl glycollate and butyl phthalyl butyl glycollate.
O. Di-lower alkyloxy-tetraglycol, e.g., dimethoxy tetraglycol and dibutoxy tetraglycol.
P. Nitrophenyl ether of lower alkylene glycols, e.g., dinitrophenyl ether of triethylene glycol and nitrophenyl ether of polypropylene glycol.

EXAMPLE 1

In this example dinitro-n-propyl ether was prepared by reacting 1.5 mols of isomers of dinitrochlorobenzene and n-propanol. An excess of the alcohol was used in order to provide solvent action; 200 grams of alcohol was present. A 50 percent solution of sodium hydroxide in water containing 1.5 mols of the caustic was added to the dinitrochlorobenzene-propanol solution in a flask provided with a reflux condenser. The temperature of the reaction flask was maintained at just below the boiling point of the mixture. After all the caustic solution had been added the flask was maintained at the simmer point for two hours. After this time the material in the flask was diluted with water to precipitate a solid material. This solid material was washed with hot water to remove sodium dinitrophenolate by-product of the reaction. The final dinitrophenyl-n-propyl ether product was obtained in 70 percent yield as an oily solid.

EXAMPLE 2

The dinitrophenyl-n-propyl ether was admixed with lacquer grade cellulose acetate analyzing about 55 percent acetic acid and also with polyvinyl chloride. The cellulose acetate composition contained 33 percent of the polymer and 67 percent of the defined ether. The composition was thermoplastic with a melting point on the order of 118° C. At room temperature the composition was rubbery and had good tensile strength. The composition containing 30 percent of polyvinyl chloride and 70 percent of defined ether was rubbery thermoplastic material of good tensile strength at room temperature.

EXAMPLE 3

Several compositions were made up consisting of one or two polymers, a defined ether and one or more adjunct plasticizers. The ingredients and the amount of each ingredient in these particular compositions is set out below. All of these compositions were thermoplastic having a melting point on the order of 100° C. or higher with rubbery characteristics and good tensile strength at room temperature.

Table

| Composition | Polymer (percent) | Dinitrophenyl-n-propyl-ether, Percent | Adjunct Plasticizer (percent) |
|---|---|---|---|
| A | Cellulose Acetate (33). | 33 | Glycol Diglycollate (33). |
| B | Polyvinyl Chloride (25). | 25 | Dinitrotoluene (20). Dinitrodiphenyl ether (30). |
| C | Polyvinyl Chloride (25). | 37 | Dibutyl diglycollate (39). |
| D | Polyvinyl Butyral (40). | 15 | Triethylene glycol di(2-ethyl butyrate) (30). Dinitrodiphenyl ether (15). |
| E | Styrene-Acrylonitrile (30). | 35 | Dinitrodiphenyl ether (35). |
| F | Polyvinyl Acetate (40). | 30 | Dinitrophenyl ethylacetate (10). Triethylene glycol di(2-ethylbutyrate) (20). |
| G | Polyvinyl Acetate (40). | 30 | Dinitrodiphenyl ether (10). Ethylphthalyth ethyl glycollate (20). |
| H | Cellulose Acetate (27). | [1] 73 | |

[1] Dinitrophenyl allyl ether.

EXAMPLE 4

Several ammonium nitrate-type propellants were prepared using dinitrophenyl-n-propyl ether as the polymer plasticizer or as one of the polymer plasticizers. These propellant compositions were prepared by intermingling the particular polymer and the plasticizer(s) at a temperature on the order of 130° C. until a fairly fluid homogeneous material was obtained. A mixture of ammonium nitrate and an inorganic combustion catalyst was then added to the mixer and the whole stirred at about 100° C. until a uniform plastic mass was obtained. The plastic mass could be extruded into shaped configurations or could be cast into configurations. For test purposes slabs of propellant were cast. These slabs were then cut up into strips which could be used for determining the burning rate, inches per second, of the propellant composition. All of the propellant compositions set out below had adequate physical properties and burning rates for use in assisted-take-off units (Jato).

Propellant composition A; ammonium nitrate 74 percent, inorganic combustion catalyst 2 percent, lacquer grade cellulose acetate 8 percent, and dinitrophenyl-n-propyl ether 16 percent.

Propellant composition B; ammonium nitrate 74 percent, inorganic combustion catalyst 2 percent, lacquer grade cellulose acetate 8 percent, glycol diglycollate 8 percent and dinitrophenyl-n-propyl ether 8 percent.

Propellant composition C; ammonium nitrate 82 percent, inorganic combustion catalyst 3 percent, styrene-acrylonitrile 4.5 percent, 2,4-dinitrodiphenyl ether 5.2 percent, and dinitrophenyl-n-propyl ether 5.3 percent.

Propellant composition D; ammonium nitrate 80 percent, inorganic combustion catalyst 3 percent, polyvinyl chloride 4.2 percent, diallyl diglycollate 2.6 percent, and dinitrophenyl-n-propyl ether 10.2 percent.

Thus having described the invention, what is claimed is:

1. A thermoplastic composition consisting essentially of dinitrophenyl-R-ether where R is selected from the class consisting of propyl and allyl and between about 18 and 40 percent of a polymer selected from the class consisting of cellulose esters of acids from the group acetic, propanoic and butyric, polyvinyl butyral, polyvinyl chloride, polyvinyl acetate, a copolymer of styrene-acrylonitrile, polystyrene, polyacrylonitrile and asphalt.

2. A thermoplastic composition consisting of about 35 percent of cellulose acetate and the remainder dinitrophenyl-n-propyl ether.

3. A thermoplastic composition consisting of about 25 percent of polyvinyl chloride, 30 percent of dinitrodiphenyl ether and 20 percent of dinitrotoluene.

4. A thermoplastic composition consisting of about 30 percent of polyvinyl chloride and 70 percent of dinitrophenyl-n-propyl ether.

5. A thermoplastic composition consisting of about 35 percent of dinitrophenyl-n-propyl ether, 30 percent of a copolymer of styrene-acrylonitrile and about 35 percent of dinitrodiphenyl ether.

References Cited in the file of this patent

UNITED STATES PATENTS

| | | |
|---|---|---|
| 2,545,597 | Ashford et al. | Mar. 20, 1951 |
| 2,581,972 | Rottschaefer | Jan. 8, 1952 |
| 2,715,112 | Stanton et al. | Aug. 9, 1955 |